Figure 1:
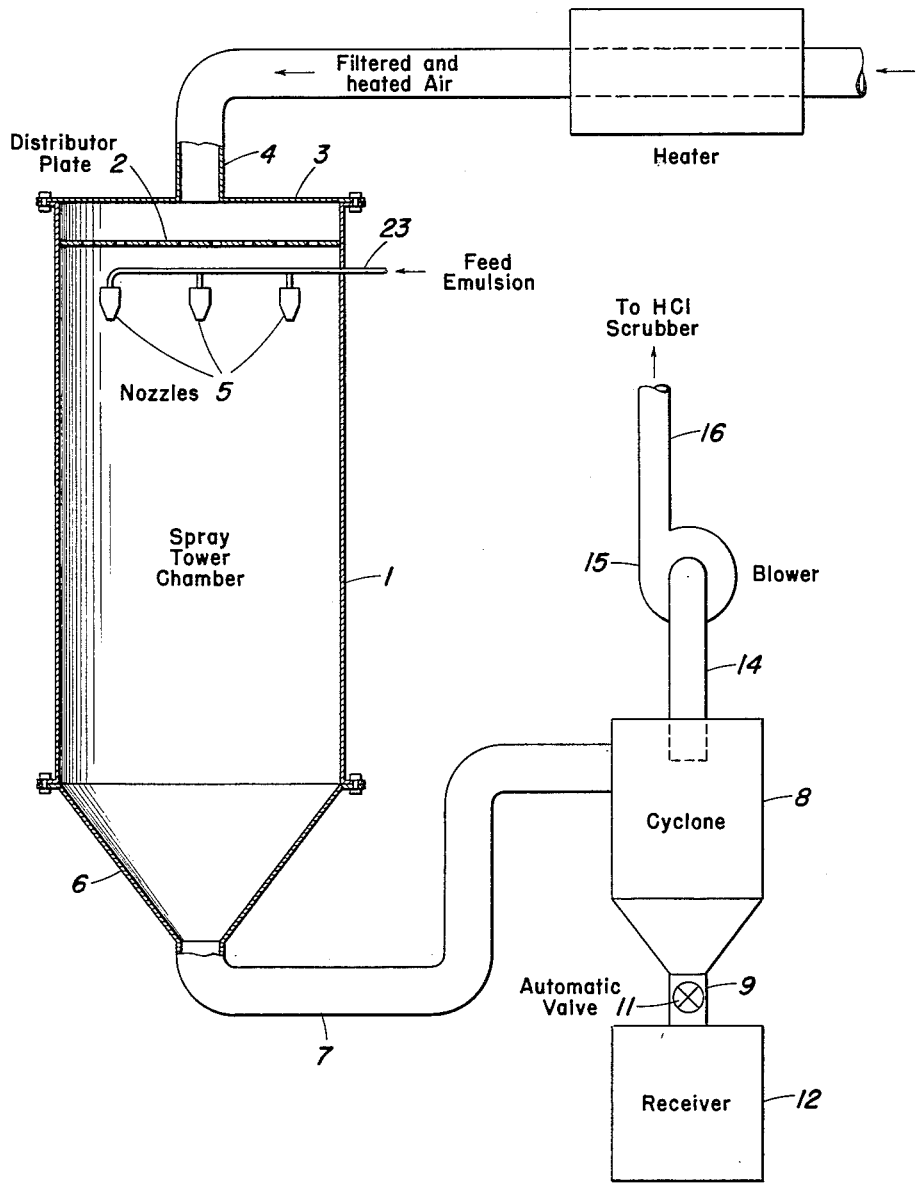

Fig. I.

United States Patent Office 3,040,073
Patented June 19, 1962

3,040,073
CONTINUOUS MANUFACTURE OF BETA-SULFO-
ETHYL-ESTERS OF FATTY ACIDS
Herman H. Tiedemann, Scotch Plains, N.J., assignor to
General Aniline & Film Corporation, New York, N.Y.,
a corporation of Delaware
Filed Oct. 25, 1956, Ser. No. 618,264
4 Claims. (Cl. 260—400)

The invention here presented is a new and useful process and apparatus for the continuous manufacture of the beta-sulfoethylesters of fatty acids, and the like.

The beta-sulfoethylesters of various fatty acids are important intermediates for the manufacture of a wide range of valuable chemical substances such as dyestuffs, pharmaceuticals, cleaning compounds and the like, as well as many other valuable chemical substances such as detergents, scouring agents, dyeing aids and similar items. These substances have previously been manufactured merely by conducting the reaction in the kettle between the sodium isethionate or the like, with the desired fatty acid chloride. The sodium isethionate is a solid, usually more or less pulverized, and most of the fatty acid chlorides are liquid, or melt upon a slight elevation of temperature and in the past the desired beta-sulfoethylesters of the fatty acid has been obtained merely by mixing the two substances, warming them to about 140° C., whereupon the reaction occurs to evolve considerable quantities of hydrogen chloride. When the hydrogen chloride ceases to be evolved the reaction is complete, and the reaction product is a putty like material, which upon cooling, hardens and is readily broken up or pulverized. It may be used in this state, or may be given various purification treatments.

This procedure is however highly undesirable, because of overheating in the kettle which necessarily occurs, due to the fact that the reaction is exothermic, the heat conductivity of the material is small and the viscosity is so high as to make stirring extremely difficult. In consequence the yield is substantially below theoretical and the quality of the product is below that desired, because of the tendency to overheat. Also the physical character of the material makes it difficult to dump and clean the kettle, and in general the procedure is unsatisfactory and undesirable.

The present invention provides a continuous process whereby the reaction is conducted, not in a kettle or in a batch, but in a continuous stream of mixed reactants sprayed or atomized into a current of hot gas whereby a steady flow of material into the reactor and a steady stream of finished product out of the reactor is obtained with an outstanding saving in equipment and labor costs, much better control of the reaction, higher efficiency and an avoidance of the troublesome surges of large quantities of hot hydrogen chloride characteristic of batch processes.

According to the present invention, the solid sodium isethionate is pulverized to a fine powder, mixed with the liquid fatty acid chloride and sprayed into a tower filled with hot gas at a temperature well above the reaction temperature. By this procedure the reaction is caused to occur in the fine droplets and is a steady continuous reaction resulting in a slow, steady release of hydrogen chloride as distinguished from the surges of gas from the prior processes. The reaction product is collected from the bottom of the tower in the form of fine particles which do not coalesce, do not require any stirring or any other manipulation and retain their granular form through subsequent processing. The hot gas which brings the material to the reaction temperature may be recycled with a corresponding saving of heat, or it may be discharged through a heat exchanger to hydrogen chloride recovery equipment; or preferably the major portion of the hot gas may be recycled and a small side stream taken off through a heat exchanger if desired, and the hydrogen chloride recovered from this side stream. In this arrangement it is of course essential that the side stream containing hydrogen chloride be replaced by an entering stream of air, preferably heated.

It may be noted that the reaction is moderately exothermic but the reaction temperature is high enough and the amount of heat carried out by the hot finished product is of substantial quantity; and in addition the heat radiated from the reactor and the various ducts and incidental equipment is sufficiently great to absorb more heat than is released by the exothermic reaction with the result that the heat losses are sufficiently large to require the addition to further heat energy to maintain the necessary reaction temperature.

For the practicing of this continuous reaction process, there is required a spray tower which may have any convenient diameter ranging from a few inches to a considerable number of feet. The height of the tower then depends upon the temperature of the entering gases, which temperature controls the speed of the reaction. If the temperature is relatively high, from 250–500° C., a relatively short tower of a small number of feet in height is satisfactory. There is, however, under these circumstances, some danger of overheating and injury to the product. If the temperature is relatively low, between about 140 and 300° C., the danger of overheating is avoided but a considerably taller tower is required for the reaction. The tower is equipped at the top with spray nozzles and means for forcing the reaction mixture through them. A discharge outlet is provided at the bottom of the tower preferably leading to a "cyclone" type dust collector having a delivery outlet at the bottom, preferably equipped with an automatic discharge valve leading to a receiver. A suction blower is also connected at the top of the cyclone separator, leading through a heater to the top of the reaction tower. A discharge outlet is also provided for the removal of a side stream containing gaseous hydrogen chloride.

Thus the procedure of the invention grinds sodium isethionate into a fine powder, mixes it with liquid fatty acid chloride and discharges the mixture through a spray nozzle into a downwardly moving current of hot air at a temperature well above the reaction temperature of the materials. The reaction occurs during the downward travel of the sprayed particles and hydrogen chloride gas is liberated continuously during the discharge of reaction mixture through the spray nozzles. The reaction product, in finely powdered globules, is then collected for use and the gas reheated and recirculated for fresh reaction.

An equipment for this continued process takes the form of a tower having a convenient diameter according to the rate at which product is desired, and a height depending upon the temperature of the circulating gas. To this tower there is then connected a collector cyclone, a circulating blower, a heater and a bleed line for excess hydrogen chloride.

Figure 2:
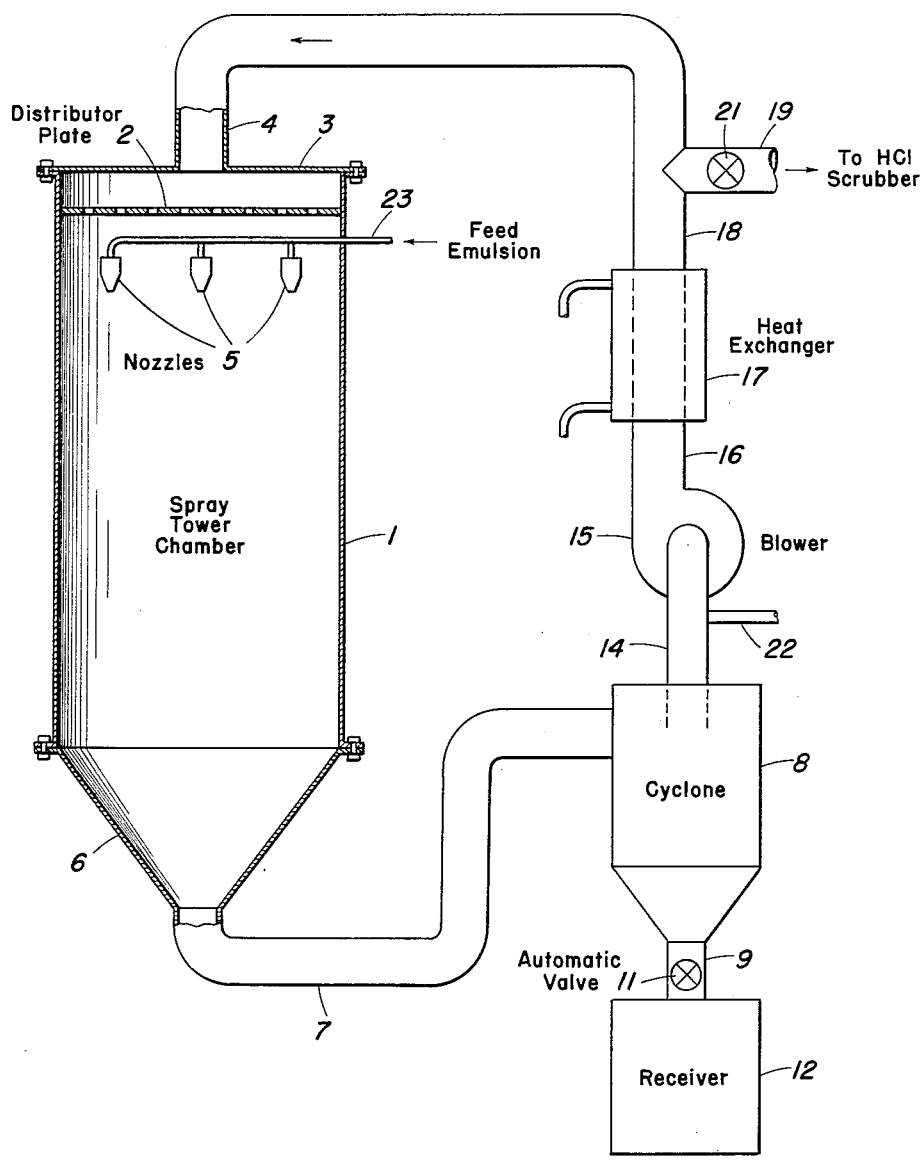

Other objects and details of the invention will be apparent from the following description when read in connection with the accompanying drawings in which FIG. 1 is a side view, partly in section of a form of the reactor in which the gases are not recirculated and FIG. 2 is a side view partly in section of a form of the invention in which the hot gases are recirculated and a small side stream taken off to remove the excess hydrogen chloride.

Referring to the figures, there is provided a spray tower 1 which, as previously indicated, may have a diameter ranging from a few inches to a considerable number of feet. The preferred diameter is approximately 5 feet but the diameter may be increased, especially if the demand for product is high and it is desired to work at low temperatures, to as much as 15 or even 20 feet. The height of the tower will then vary according to the preferred operating temperature, and at high temperatures may be as short as 5 to 8 feet, whereas at low operating temperatures it may be as high as 15 to 20 feet or even as high as 30 feet; the choice of height depending mainly upon the temperature of reaction, but in part upon the rate of gas flow and in part upon the particular reaction utilized since all of the reactions which may conveniently be conducted in this device do not have the same reaction speed. At the top of the spray tower there is provided a distributor plate 2 to insure a uniform flow of hot gas downward, and a cover member 3 is provided which is conveniently held in place by the use of a flange attached to the tower 1 carrying bolts for holding the cover 3 in place. An air supply duct 4 is also provided entering through the cover 3. At the top of the tower just under the distributor plate 2 there is provided a series of nozzles 5, as shown. The tower 1 preferably contains no filling but is simply open for the downward passage of the globules of reaction mixture produced by the spray nozzles. At the bottom of the tower 1 there is provided a collector member or funnel 6 which is similarly bolted to the tower 1 by flanges and bolts, as shown. The collector funnel 6 enters a discharge duct 7 leading to a cyclone collector 8. The bottom of the cyclone collector 8 is provided with a discharge duct 9 containing an automatic valve 11 leading to a receiver 12. A gas discharge duct 14 is connected at the top of the cyclone 8 leading to a blower 15 which discharges through a duct 16 to a hydrogen chloride scrubber. An air preheater 17 is provided, connected to the duct 4. This may conveniently take the form of any desired type of air heating means such as pipes heated by high pressure steam, or a welded structure of tubes heated by any convenient flame, or may take the form of tubes carrying melted "Wood's" metal or "Dowtherm" or other convenient heat transfer means.

This device provides for the continuous operation of the spray nozzle and continuous reaction, but it discards the hot gas thereby losing a considerable amount of heat energy.

It is found that the reaction is not significantly interfered with by the hydrogen chloride concentration and accordingly the device of FIG. 2 may be used in which the heated air is recirculated. In this form the structures of FIG. 1 are retained, and the heating means 17 is provided which may take any desired form, as above pointed out. The inlet of the heater 17 is connected via the duct 16 to the blower 15 and an outlet 18 is provided. The heat exchanger 17 is connected to the duct 4 leading to the top of the spray chamber 1. A side stream of the circulating gas is then taken off through an outlet 19 equipped with a valve 21, and a small feed duct 22 is provided, connected to the duct 14 for the entrance of a small stream of fresh air to replace the air removed with the hydrogen chloride through the duct 19.

The primary raw materials for the process of the invention are, first, sodium isethionate which, being a solid at room temperature, is pulverized to the form of a fine powder to bring the average particle size from less than about 200 microns, to about 3 microns in diameter. This fine powder is then mixed with the second component, the liquid fatty acid chloride, preferably slightly warmed to increase the fluidity. The desired reaction between these two components is shown in the following equation:

$$HO-CH_2CH_2-SO_3Na + RCOOCl \rightarrow RCOOCH_2CH_2SO_3Na + HCl$$

This mixture is then delivered to the spray nozzles 5 through a supply duct 23 by any convenient pressuring means which may take the form of a blow case or may be a diaphragm or plunger pump or may be a centrifugal pump as desired. The pressure required is relatively low, being merely sufficient to get a good spray action from the nozzles 5. Simultaneously the blower 15 is put into operation and the heater 17, or the heater connected to the duct 4, is put into operation to deliver air at the desired temperature to the tower 1. The reaction proceeds promptly and is complete by the time the sprayed globules have reached the collector funnel 6. They are drawn from the funnels through the duct 7 into the cyclone 8 where they are separated from the current of hot gas, and passed down through the valve 11 to the receiver 12 from which they may be removed for packaging, shipment or immediate use as desired.

It may be noted that the continuous operation is made feasible by the fine grinding of the solid sodium isethionate and its subsequent homogenization with the liquid fatty acid chloride. Settling of the solid phase in this form is extremely slow, so that the mixture of sodium isethionate and fatty acid chloride may be prepared and stored for a substantial time which may run several hours or even days, especially if some stirring is provided and the material remains ready for use. Ordinary hammer milling gives a ground sodium oxyethane which settles rapidly after homogenization with the fatty acid chloride and the continuous reaction no longer succeeds.

Example 1

A series of planned runs were made in the apparatus as above described and the results are shown in the following table:

| Run | Feed Temp., °C. | Inlet Air Temp., °C. | Outlet Air Temp., °C. | Nozzle Air Pressure p.s.i.g. | Nozzle Air Temp., °C. | Feed Rate lbs./min. | Product Activity Percent |
|---|---|---|---|---|---|---|---|
| 1 | 29 | 184 | 120 | 60 | 29 | 1.3 | 11 |
| 2 | 67 | 184 | 125 | 40 | 50 | 0.74 | 6 |
| 3 | 70 | 142 | 105 | 20-40 | 50 | 0.74 | 3.6 |
| 4 | 29 | 164 | 110 | 70-75 | 50 | 2.0 | 45.4 |

In the above table the first column gives the run number; the second column gives the entering temperature of the mixture of sodium isethionate and fatty acid chloride; the third column gives the entering temperature of the circulating air at the top of the tower 1; the fourth column gives the exit temperature of the gas in the duct to the cyclone separator; the fifth column shows the nozzle spray pressure; the sixth column shows the temperature of the spray air used to atomize the mixture; the seventh column shows the rate of feed in pounds per minute; and the 8th column shows the ratio of finished product to diluents, impurities and unreacted material.

It may be noted that the size of the particles of sodium isethionate is preferably quite small, and particles as small as 3 microns in diameter can be obtained by a "homogenizing" process either before or after the mixing with the fatty acid chloride. However the size of particle depends to a considerable extent upon the type of spray nozzle used and also upon the height of the tower. If the spray nozzles produce a very fine spray which falls slowly through a short tower, then it is essential that the particle size of the sodium isethionate be close to 3 microns. If, however the spray nozzles yield a relatively coarse spray in a tall tower at a fairly high temperature, the particle size may be considerably larger, within the range between 40 microns and 200 microns although in some instances, with intermediate size of sprayed droplets, the particle size may fall within the range between 3 microns and 40 microns.

The choice of particle size is an economic matter in which the cost of pulverizing is balanced against the cost of larger equipment and higher temperatures.

The above disclosure presents primarily the esterification of isethionic acid, but the reaction is a general one utilizing any of the 2-hydroxy alkane sulfonic acids, which are converted into alkali metal, alkaline earth metal, periodic table group 2B metal or organic base salts, and employed in accordance with the foregoing process are characterized by the following general formulae.

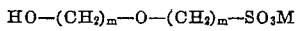

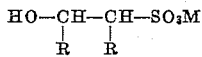

wherein R represents either hydrogen, lower alkyl, methyl, ethyl, propyl, butyl, etc., M represents an alkali metal e.g. lithium, sodium and potassium; alkaline earth metal, e.g. calcium, strontium, barium, periodic table group 2B metal, e.g. magnesium, etc., or an organic base, e.g. pyridine, quinoline, triethanolamine, etc., and $m$ represents 1 or 2. It is to be noted that any organic base, whether aliphatic or alicyclic; saturated or unsaturated, may be employed instead of the aforementioned specific bases.

As examples of 2-hydroxy alkane sulfonic acids that are esterified with carboxylic acid chlorides, the following are illustrative:

Isethionic acid
$\beta$-hydroxy-dimethylether-$\beta$-sodium sulfonate
$\beta$-hydroxy-diethylether-$\beta$-sodium sulfonate
2-hydroxy-2-methylethane sulfonic acid
1,2-dimethyl-2-hydroxy sulfonic acid
2-hydroxy-2-ethyl-sulfonic acid
2-hydroxy-propane-sulfonic acid
2-hydroxy-2-butane-sulfonic acid
2-hydroxy-1-butane-sulfonic acid No particular fatty acid chloride is named in the above disclosure because of the fact that any desired fatty acid chloride may be used, provided only that it contains a minimum of six carbon atoms. Acids of this type may be caproic acid, capryllic acid, capric acid, lauric acid, myristic acid, palmitic acid, stearic acid, oleic acid, linoleic acid, tall oil acids, abietic acids, etc., alkyl benzoic acids such as dodecylbenzoic acid, nonylbenzoic acid, octylbenzoic acid, acids from oxo alcohols and aldehydes, acids from oxidized petroleum fractions, etc., alkylated phenyl acetic acids, e.g. p-decylphenyl acetic acid, m-nonylphenyl acetic acid, etc., acid mixtures from various natural plant and animal oils such as olive, tallow, castor, peanut, coconut, soybean, cottonseed, ucahuba, linseed; fish oils such as cod, herring, menhaden, etc., neat's-foot, sperm, palm, corn, butter, babassu, kapok, hampseed, mustard, rubberseed, rape, safflower, sesame, etc., in the form of the acid chloride may also be employed.

The salts of the 2-hydroxy alkane sulfonic acids are readily prepared by neutralization of the acids with an equivalent amount of alkali metal, alkaline earth metal, or a periodic table group 2B metal hydroxide or carbonate, or an organic base in the conventional manner.

Thus the process of the invention pulverizes an isethionate, mixes it with a liquid fatty acid chloride, sprays the mixture into a current of hot gas for the production of a reaction between the components, the reaction being conducted in an unpacked tower in a circulating current of hot gas to complete the reaction, transfer the reaction product to a collector and separating the solid reaction product from the recyclable gas stream.

While there are above disclosed but a limited number of embodiments of the process and apparatus of the invention it is possible to provide still other embodiments without departing from the inventive concept herein disclosed, and it is therefore desired that only such limitations be imposed upon the appended claims as are stated therein or required by the prior art.

The invention claimed is:

1. In a process for producing surface active agents by reaction of a salt of a 2-hydroxyalkane sulfonic acid with a higher fatty acid chloride, the improvement, whereby the reaction may be effected in a continuous manner, which comprises pulverizing said salt of 2-hydroxyalkane sulfonic acid to a particle size within the range of 3 microns to 200 microns, mixing the thus pulverized salt with a liquid higher fatty acid chloride having at least 6 carbon atoms per molecule thereof, spraying the thus formed mixture into a stream of hot gas whereby said salt and said fatty acid chloride react to form the ester and separating the particles of the thus formed ester from the gas.

2. The process as defined in claim 1 wherein the salt of 2-hydroxyalkane sulfonic acid specified is sodium isothionate.

3. The process as defined in claim 1 wherein the salt of 2-hydroxyalkane sulfonic acid specified is a salt selected from the group consisting of the alkali metal salts, the alkaline earth metal salts, the magnesium salts and the pyridine, quinoline, and triethanolamine salts of a 2-hydroxyalkane sulfonic acid selected from the group consisting of isethionic acid, $\beta$-hydroxy-dimethylether-$\beta$-sulfonic acid, $\beta$-hydroxy-diethylether-$\beta$-sulfonic acid, 2-hydroxy-2-methylethane sulfonic acid, 1,2-dimethyl-2-hydroxy sulfonic acid, 2-hydroxy-2-ethyl sulfonic acid, 2-hydroxy-propane-sulfonic acid, 2-hydroxy-2-butane-sulfonic acid and 2-hydroxy-1-butane sulfonic acid.

4. The process as defined in claim 3 wherein the higher fatty acid chloride specified in an acid chloride of a fatty acid selected from the group consisting of caproic acid, capryllic acid, capric acid, lauric acid, myristic acid, palmitic acid, stearic acid, oleic acid, linoleic acid, tall oil acids, abietic acids, didocylbenzoic acid, nonylbenzoic acid, octylbenzoic acid, acids from oxo alcohols and aldehydes, acids from oxidized petroleum fractions, alkylated phenyl acetic acids and acid mixtures from natural plant and animal oils of the group consisting of olive, tallow, castor, peanut coconut, soybean, cottonseed, linseed; fish, neat's-foot, sperm, palm, corn, butter, babassu, kapok, hempseed, mustard, rubberseed, rape, safflower, and sesame oils.

References Cited in the file of this patent

UNITED STATES PATENTS

| Re. 23,823 | Molteni et al. | May 8, 1954 |
| 1,881,172 | Daimler et al. | Oct. 4, 1932 |
| 2,697,031 | Hervert | Dec. 14, 1954 |

FOREIGN PATENTS

| 553,212 | Great Britain | May 12, 1943 |